Feb. 5, 1935.  E. ALBRECHT  1,990,013
STOCKING INSPECTING AND TESTING MACHINE
Filed Jan. 18, 1934   3 Sheets-Sheet 1

Inventor
E. Albrecht
By Clarence A. O'Brien
Attorney

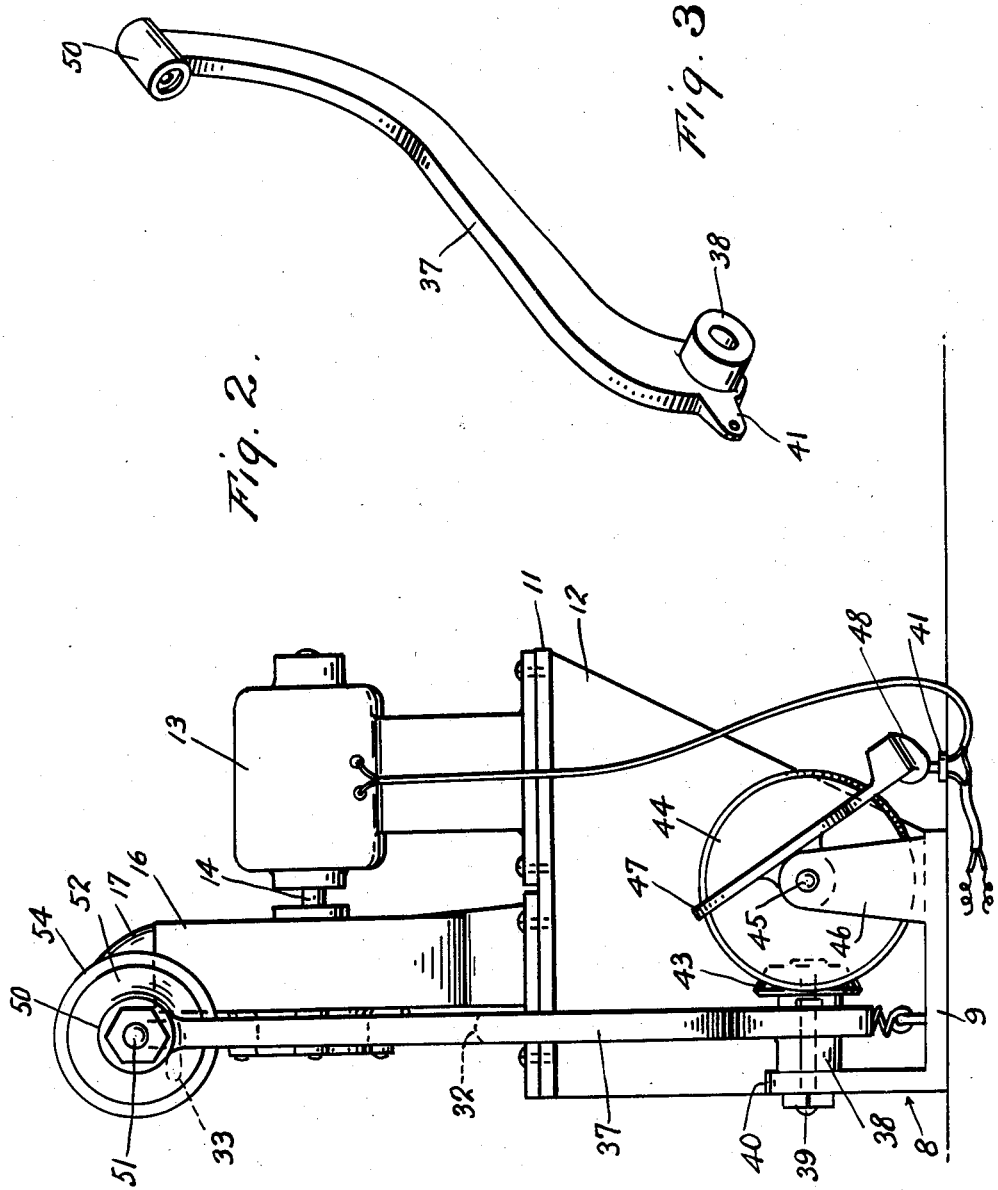

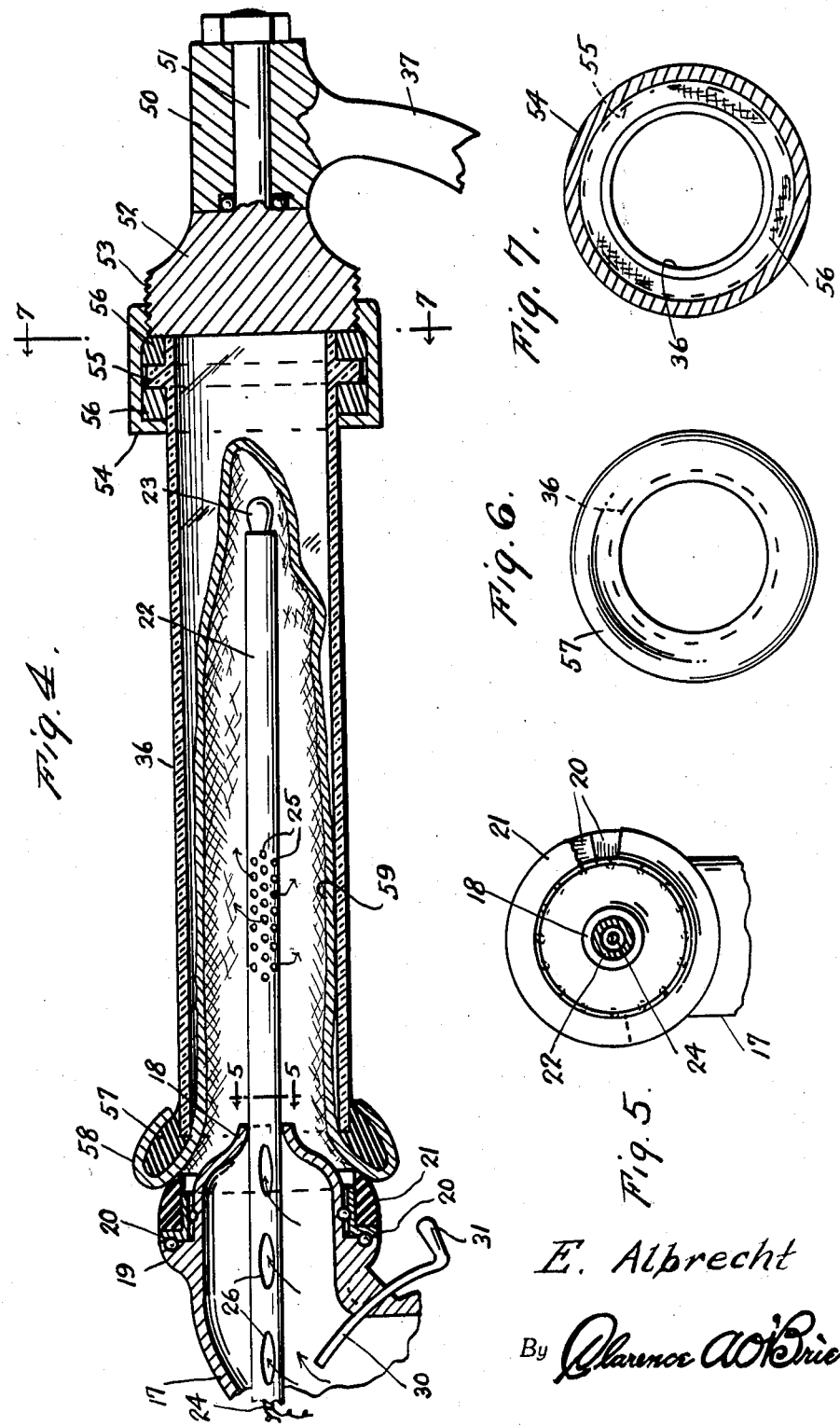

Patented Feb. 5, 1935

1,990,013

UNITED STATES PATENT OFFICE 1,990,013

STOCKING INSPECTING AND TESTING MACHINE

Edward Albrecht, Philadelphia, Pa.

Application January 18, 1934, Serial No. 707,215

11 Claims. (Cl. 223—19)

This invention relates to a stocking inspecting and testing machine such as is expressly fashioned and designed to facilitate and render reliable the demonstration of different brands and styles of women's, and misses', stockings at the factory or in the public as desired.

It is a matter of common knowledge to those familiar with this line of endeavor and industry to know that the present day types of machines used for this demonstration work require entirely too much personal handling of the merchandise. Such handling is not only unsanitary but is frequently objectionable to the prospective purchaser and results in waste of time and goods in that the texture is frequently ruined by the demonstrator or the unreliable type of frame or holder on which it is haphazardly placed and removed for inspection purposes.

Being conversant with the types of testing and inspection machine now marketed I have discovered the need for a structural arrangement which minimizes handling of the merchandise and at the same time provides for a more satisfactory and dependable demonstration in that the stocking is inflated by air in a glass inspection tube of limited proportion and at the same time trans-illuminated.

Briefly stated the preferred embodiment of the invention embodies an electric motor driven blower having an especially constructed air discharge nozzle cooperable with a transparent inspection tube in which the stocking is placed and distended by air inflation in order to permit the accomplishment of faithful results by adequately showing the texture of the material, demonstrating its yieldable characteristics and disclosing imperfections in its construction.

Other features and advantages will become more readily apparent from the following description and drawings.

In the drawings:

Figure 2 is an end elevational view looking at Figure 1 in a direction from right to left.

Figure 3 is a detail perspective view of the tiltable or swingable inspection tube carrier arm.

Figure 4 is an enlarged fragmentary sectional and elevational view detailing the construction of the tube and its appurtenances and disclosing the manner of placing and distending the stocking for testing and inspecting purposes.

Figure 5 is an enlarged detail section taken approximately on the plane of the line 5—5 of Figure 4.

Figure 6 is an end elevational view of the rubber collar equipped or open end of the glass inspection tube.

Figure 7 is a transverse or cross sectional view taken approximately on the plane of the line 7—7 of Figure 4.

Figure 1:
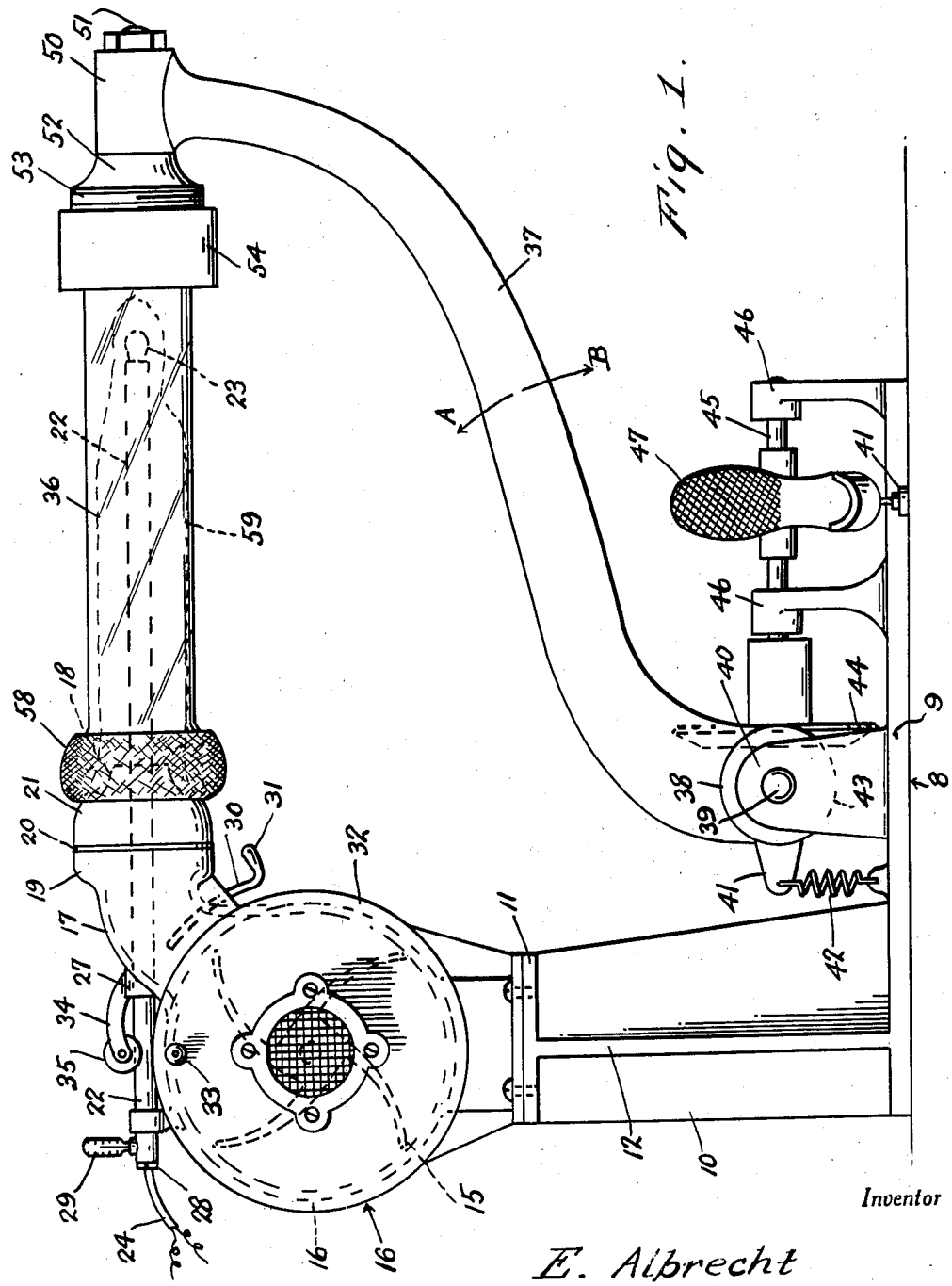
Figure 1 is an elevational view of the complete machine as developed in accordance with the principles of the present invention showing the manner in which it is used.

Referring now to the drawings by distinguishing reference numerals and calling attention first to Figure 1 it will be observed that the numeral 8 designates a stand which includes a suitable base plate 9 and a vertical standard 10. The standard includes a horizontal platform 11 supported by a suitable brace web 12 and itself serving as a support for a suitable electric motor 13. The shaft 14 of the motor serves to operate an impeller fan 15 located in a blower casing 16 also supported on the platform or plate 11. Extending laterally from the periphery of the blower casing is an air delivery duct or neck 17 which is especially fashioned as shown in Figure 4. In the latter figure it will be observed that this duct terminates in an air discharge nozzle 18 of tapered or restricted form. As also shown here the numeral 19 designates an abutment flange which serves to accommodate a rotary anti-friction ball race which is here shown as composed of a pair of complemental half-sections 20 surrounding the nozzle and bearing against the flange and associated with anti-friction balls. These sections 20 as better shown in Figure 5 are held in place by a surrounding rubber annulus 21 which functions primarily as an adapter ring or annulus. The function of this will be clear as the description proceeds. Incidentally the air from the blower can be exhausted directly through the nozzle 18 or indirectly through the instrumentality of a distributing and inflation pipe 22. In Figure 4 it will be noted that one end of this pipe carries an electric bulb 23 which is electrified by a suitable cable or conductor 24 which extends through and beyond the left hand end of the pipe as shown in Figure 1. Intermediate its ends the pipe 22 is provided with a multiplicity of air discharge ports or orifices 25. Adjacent the left hand end it is provided with air intake slots or openings 26. The air passing upwardly through the neck or duct 17 enters these slots, passes through the pipe and is discharged through the openings 25. This pipe is slidably supported in a bearing 27 in the manner shown in Figure 1 and also partly supported in the nozzle 18 which is in effect a secondary bearing or guide. The left hand end of the pipe is closed by a suitable fitting as shown at 28 and at this point there is a pressure gauge 29. In order to regulate the pressure entering the slots 26 I provide a cut out valve plate 30 of appropriate construction which is slidably mounted in the duct and adjusted through the medium of an appropriate handle 31.

I call attention at this time to Figure 1 wherein the numeral 32 designates a rotary friction actuating wheel which is mounted on the air intake side of the blower casing 16. Any suitable mounting may be provided for the purpose. It will be noted that the wheel is provided with a hand grip 33 eccentrically located so that it can be conveniently turned. The marginal edge or periphery of the wheel is in contact with the slidable horizontally disposed pipe 22 so that it can be retracted and projected to the desired degree. The numeral 34 designates a bracket carried by the guide or bearing 27 and in turn carrying a stabilizing sheave 35 cooperating with the pipe to cause it to operate freely and in the requisite steady manner.

The part of the machine so far described could itself be used as a complete tester by placing the stocking over the projectible and retractible air distributing pipe 22 and placing the thigh end of the stocking over the rotary adapter or annulus 21. It is desired however that during the testing and inspecting operation the stocking should be handled as little as possible and for this reason the machine is augmented to include a protective glass cylinder into which the stocking may be telescoped and inflated in a more limited manner to avoid injury either by air pressure or excessive handling.

This precautionary and augmented part of the invention is also mounted on the stand or base and is of a swingable nature so as to facilitate application and removal of the stocking and to promote safe and practicable testing and inspection. The essential feature thereof is a horizontally or longitudinally elongated transparent glass tube 36 in which the stocking is placed in the manner shown in Figure 4 and into which the major portion of the stocking is distended or telescoped. This tube is mounted on a tiltable carrier and is rotatable around a horizontal axis so as to promote complete inspection for imperfections. The carrier is here shown in the form of a suitably shaped arm 37 having an appropriate bearing 38 at its lower end mounted for oscillation on a stub axle 39 mounted on a suitable upright 40 carried by the base plate 9. At this end of the arm is an outstanding lug 41 tied to the base plate through the medium of a contraction spring 42. This spring exerts a tension on the lug to hold the arm 37 in its normal inspection position. The arm 37 is swung up and down in the direction of the arrows A and B respectively through the instrumentality of coacting beveled gears 43 and 44 occupying the positions in relationship shown in Figure 2. The small gear 43 is operatively connected with the arm and the gear 44 is carried by an oscillatory rocker shaft 45 supported in bearings 46 on the base. Incidentally, the ratio of the gears is about 2 to 1. The rocker shaft is actuated by way of a foot pedal 47 which is keyed or otherwise mounted on said shaft. It will be noticed in Figure 2 that the heel end of the pedal is provided with a cam 48 which is positioned to operate an electric switch 49 which controls the motor 13. Thus, by moving the foot pedal 41 in one direction to actuate the rocker shaft 45, the gearing and the arm 37 come into play. Then by rocking the pedal in the opposite direction to bring the cam 48 into engagement with the switch 49, the switch is closed to start the motor and blower in operation.

Referring now to the opposite end portion of the arm 37 I call attention to Figure 4 wherein it will be observed that the arm is provided at its upper end with a bearing 50 to accommodate a rotary spindle 51 carrying a head 52 screw threaded as at 53. A coupling 54 serves to attach the glass tube 36 to the rotary head or fixture 52 so as to permit these parts to be rotated around a horizontal axis for completely inspecting the stocking which is carried by the tube. It is a matter of minor importance to note that the tube is equipped with a flange 55 held between gaskets 56 retained in the coupling 54. This is merely the means of connecting the glass tube with the rotary fixture 52 so that the parts can be bodily rotated in unison. Referring to the open or left hand end of the glass tube in Figure 4 it will be observed that it is equipped with a rubber collar 57 which is appropriately proportioned and flared to serve as an adapter collar for the rolled end 58 of the stocking 59.

In operation the foot pedal 47 is depressed to actuate the gearing and arm 37 and to swing the arm downwardly in the direction of the arrow B against the tension of the return spring 42. The pedal is held in this position until the stocking is placed in the glass tube 36. Obviously the end 58 of the stocking is rolled over the adaptation collar 57 as shown in Figure 4. Then the pedal is gradually released and the spring serves to swing the glass tube 36 back into horizontal alinement with the air pressure supply means, that is the nozzle 18 and the air distributing pipe 22. The two rubber adapter members 21 and 57 coact in preventing injury to the fine texture of the stocking as is obvious. Moreover the adapter ring 21 rotates with the glass tube 36 and its appurtenances so as to allow the stocking to be completely inspected throughout.

Assuming that the stocking has been placed in the glass tube and that the parts are in the relationship shown in Figure 1 it is obvious that by engaging the cam 48 of the foot pedal with the switch 49 the motor 13 is brought into play. This develops or generates the air pressure which is conducted through the duct 17, in through the pipe 22 by way of the slot 26 as shown by the arrows. The air pressure is conducted through the duct 17, into the pipe 22 by way of the slots 26 as shown by the arrows. The air pressure is regulated by the valve 30 as before stated. The air escaping through the ports 25 fills the stocking and inflates it in the requisite distended manner so that it can not only be tested but thoroughly inspected by the observers. The position of the projectible and retractible tube 22 is, as before indicated, regulated by the hand wheel 32 which serves to feed the pipe in and out as desired. The pipe can of course be completely retracted when the stocking is first put in place in the glass tube. Then when the tube 36 is returned to its horizontal inspection position the pipe 22 can be projected to extend the stocking longitudinally in the glass tube. Not only does the pipe 22 serve as a distributor for the air but it serves as a support for the light bulb 23 which serves to provide artificial light when necessary to facilitate inspection and location of imperfections, if any, in the texture of the material.

Novelty is thought to reside in the position of the glass tube 36 constructed to accommodate a conventional stocking, wherein any suitable means is provided at the open end of the tube for ejecting air under pressure for inflating the stocking for inspecting purposes, particularly wherein said tube is rotatably mounted on a suitable support, and especially a tiltable support such as permits the tube to be placed in an angular position to facilitate application and removal of the stocking. This is one phase of the invention.

As before indicated novelty is also thought to reside in any suitable type of blower and the support therefor wherein the blower is formed with a nozzle 18 with or without the distributing pipe 22 and wherein the features within the vicinity of the nozzle are made to accommodate a stocking, whether the stocking be placed in the tube 36 or simply stretched over the rotary annulus or adapter 21.

It is thought that persons skilled in the art to which the invention relates will be able to obtain a clear understanding of the invention after considering the description in connection with the drawings. Therefore, a more lengthy description is regarded as unnecessary.

Minor changes in shape, size, and rearrangement of details coming within the field of invention claimed may be resorted to in actual practice, if desired.

Having thus described my invention, what I claim as new is:

1. A stocking inspection and testing machine of the class described comprising a substantially straight and elongated tube adapted to receive and accommodate a stocking, said tube having one end open and its walls formed of imperforate transparent material, the open end of the stocking being located at the open end of the tube and means for introducing air into said stocking at the open end of the tube for inflating and distending said stocking in the tube.

2. A machine for inspecting and testing silk stockings and the like comprising a carrier, a glass tube mounted for rotation on said carrier, the tube being open at one end and provided at its open end with an outstanding adapter collar designed to permit the open end of the stocking to be rolled thereover with the body and toe portion of the stocking extending into the interior of the tube, and an air blower associated with the open end of said tube for delivering air into the stocking to distend and inflate the stocking in the tube for inspection purposes.

3. A stocking testing and inspecting machine of the character described comprising a base, a carrier arm pivotally mounted for swinging movement on said base, a rocker shaft on the base, a foot pedal for actuating said rocker shaft, an operating connection between the shaft and arm permitting the arm to be swung up and down, a return spring for said arm to maintain it in a predetermined normal position, stocking holding means attached to the upper end of said arm and means for inflating the stocking.

4. A stocking testing and inspecting machine of the character described comprising a base, a carrier arm pivotally mounted for swinging movement on said base, a rocker shaft on the base, a foot pedal for actuating said rocker shaft, an operating connection between the shaft and arm permitting the arm to be swung up and down, a return spring for said arm to maintain it in a predetermined normal position, stocking holding means attached to the upper end of said arm, said means comprising a rotary glass tube into which the stocking is placed and means for inflating the stocking in the tube.

5. A stocking testing and inspecting machine of the class described comprising a base, an arm swingably mounted on said base, an oscillatory rocker shaft on said base, a foot pedal for actuating said rocker shaft, gearing affording an operating connection between the rocker shaft and arm, a return spring attached to the base and arm, said arm being provided at its upper end with a bearing, a head including a spindle mounted for rotation in said bearing, an open ended glass tube attached to said head, said tube being provided at its open end with means for conveniently supporting the stocking to be inspected and means for inflating the stocking in the tube.

6. A stocking testing and inspecting machine of the class described comprising a blower, said blower embodying an air discharge neck terminating in a nozzle, means associated with said nozzle for holding the stocking with its open end against a part of the nozzle, a tube projecting from the nozzle into the stocking and a lamp carried by the tube.

7. A stocking testing and inspecting machine of the class described comprising a blower, a support therefor, said blower embodying an air discharge neck terminating in a nozzle, and means associated with said nozzle for holding the stocking in a manner to permit it to be longitudinally elongated and radially inflated for the purposes described, said means embodying a transparent tubular cylinder into which the stocking is projected.

8. A stocking inspecting and testing machine of the class described comprising an electric motor actuated blower embodying a casing and impeller fan, a support for said blower, said blower including an air delivery neck terminating in a discharge nozzle, and a horizontally disposed longitudinally elongated glass tube in alinement with said nozzle, together with means for supporting said tube and permitting it to be moved toward and from the nozzle to facilitate application and removal of the stocking to be tested.

9. A machine of the class described comprising a base, an air blower mounted on said base, a motor mounted on said base for operating the air blower, said blower including a casing having a marginal air discharge neck terminating in a discharge nozzle, a resilient adapter ring mounted for rotation on said nozzle, an air distributing pipe slidably mounted in said nozzle and having air discharge ports intermediate its ends and air intake slots, said slots being located in said neck, an electric bulb supported on the extreme outer end of said pipe, and manually regulated means on said blower cooperable with said pipe for feeding it longitudinally for retraction and projection purposes.

10. A machine of the class described comprising a base, an air blower mounted on said base, a motor mounted on said base for operating the air blower, said blower including a casing having a marginal air discharge neck terminating in a discharge nozzle, a resilient adapter ring mounted for rotation on said nozzle, an air distributing pipe slidably mounted in said nozzle and having air discharge ports intermediate its ends and air intake slots, said slots being located in said neck, an electric bulb supported on the extreme outer end of said pipe, and manually regulated means on said blower cooperable with said pipe for feeding it longitudinally for retraction and projection purposes, a glass tube, supporting means for said tube permitting the tube to be located in alinement with said nozzle, said glass tube being constructed to accommodate the stocking and disposed in relation to the nozzle to permit said distributing pipe to be telescopically projected into said tube.

11. A stocking testing machine comprising a blower provided with an air discharge neck terminating in a nozzle, means for holding the open end of a stocking against a part of the nozzle, a tube slidingly supported by the neck and nozzle and projecting into the stocking, said tube having openings therein, some of which are in that part of the tube located in the stocking and others of which are located in the neck.

EDWARD ALBRECHT.